No. 608,022. Patented July 26, 1898.
A. L. BINGHAM.
GLASS BLOWING MACHINE.
(Application filed Aug. 26, 1897.)
(No Model.) 7 Sheets—Sheet 2.

WITNESSES:
F. W. Woerner,
J. A. Walsh,

INVENTOR
Alvah L. Bingham,
BY
Chester Bradford,
ATTORNEY.

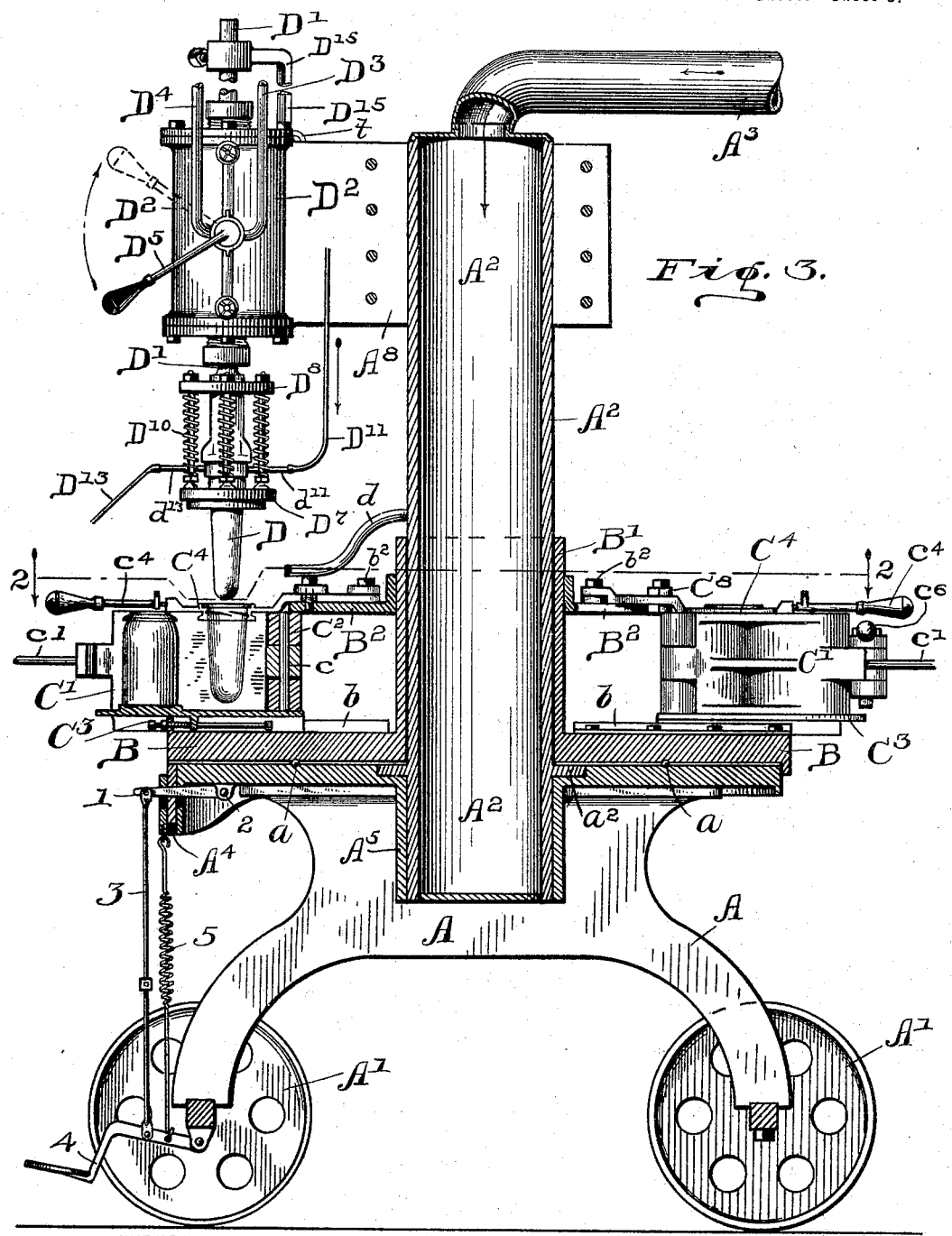

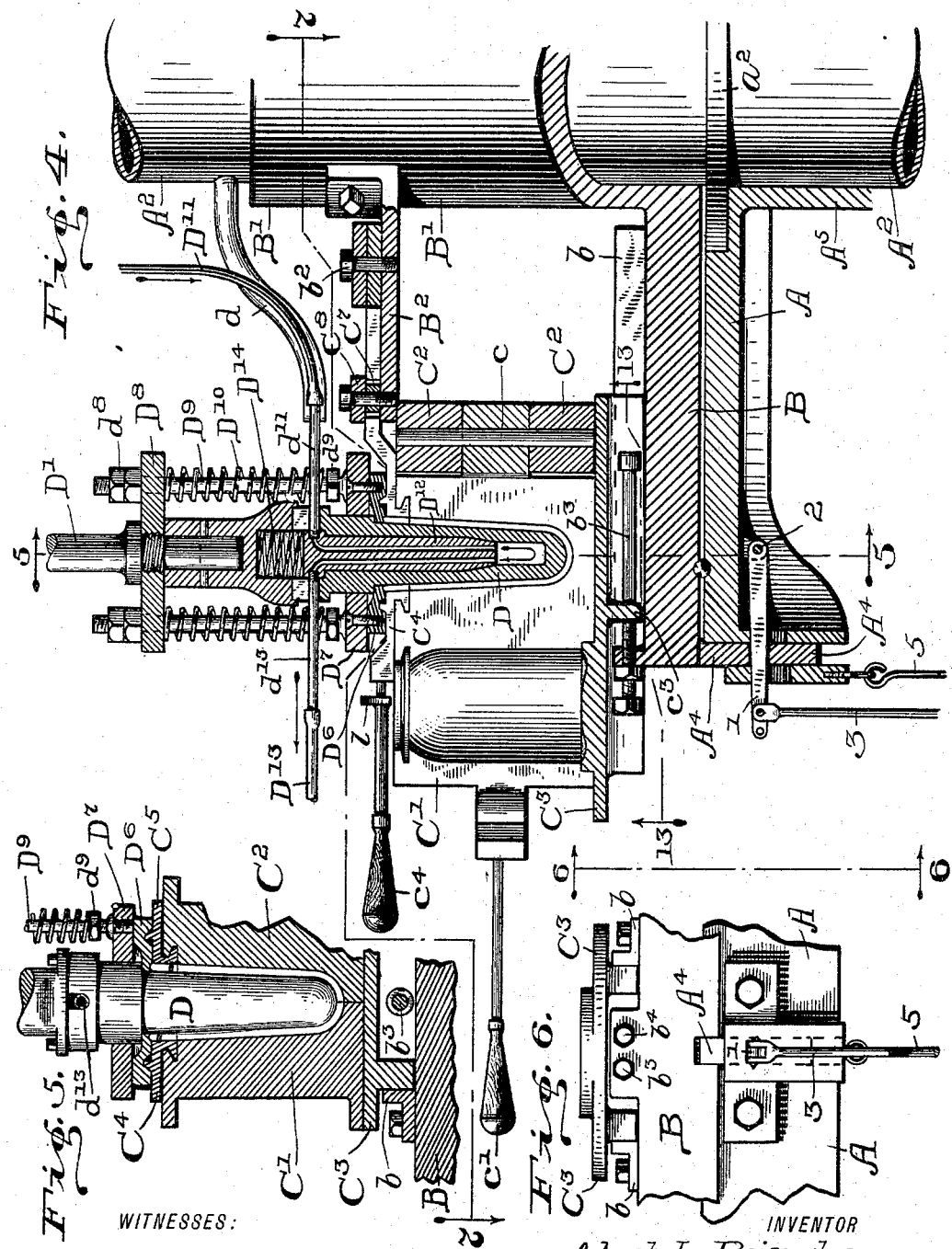

No. 608,022. Patented July 26, 1898.
A. L. BINGHAM.
GLASS BLOWING MACHINE.
(Application filed Aug. 26, 1897.)
(No Model.) 7 Sheets—Sheet 5.

WITNESSES: INVENTOR
F. W. Woerner. Alvah L. Bingham
J. A. Walsh. BY
Chester Bradford,
ATTORNEY.

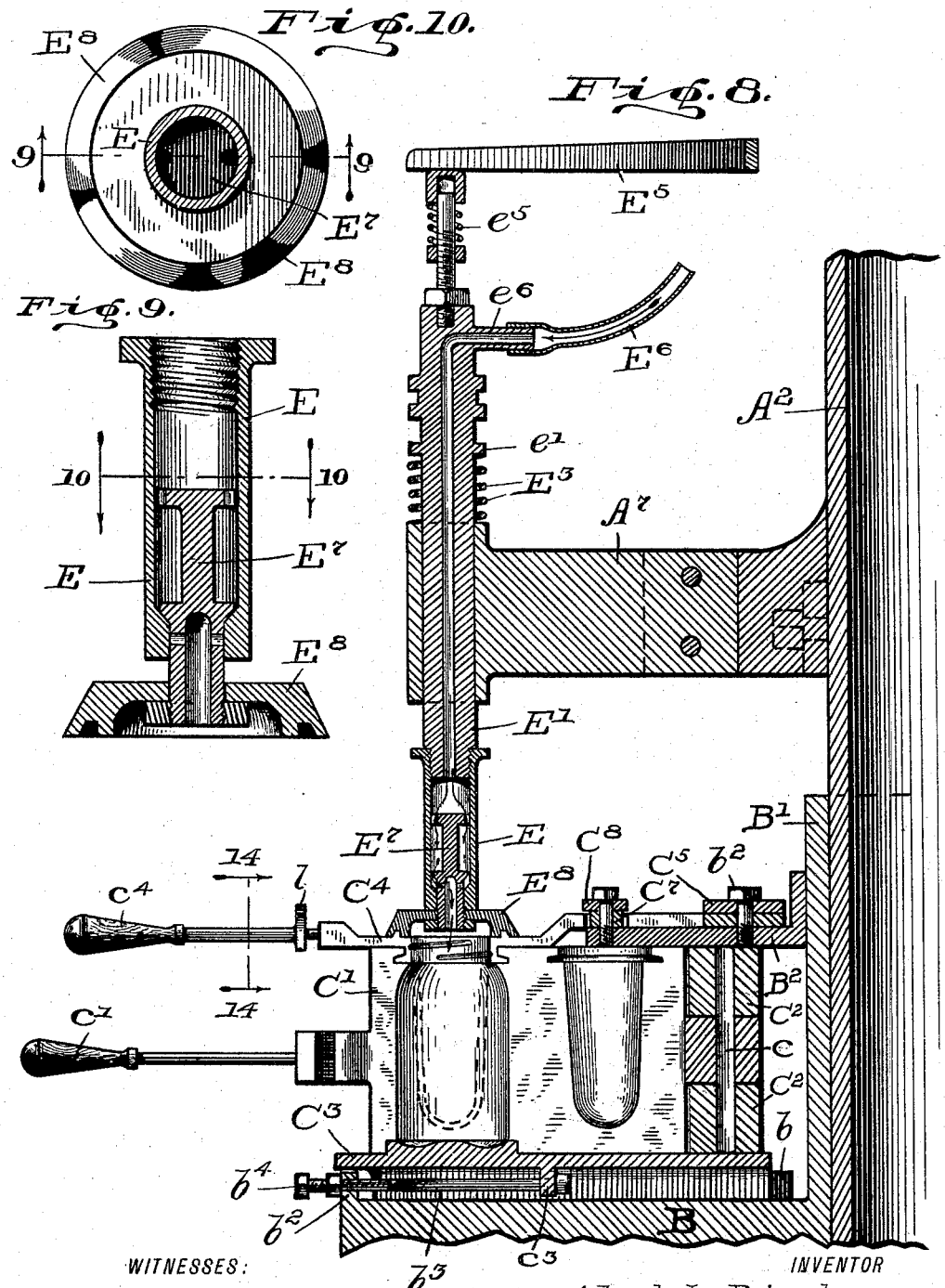

No. 608,022. Patented July 26, 1898.
A. L. BINGHAM.
GLASS BLOWING MACHINE.
(Application filed Aug. 26, 1897.)
(No Model.) 7 Sheets—Sheet 7.
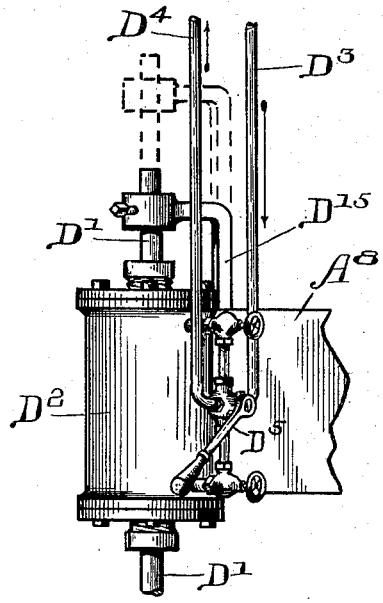
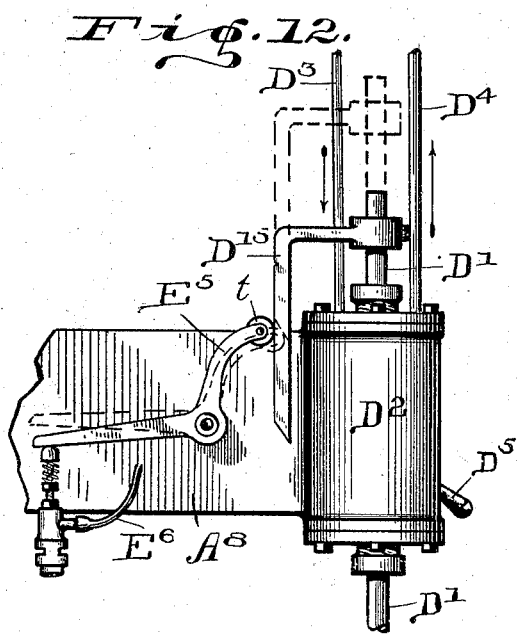
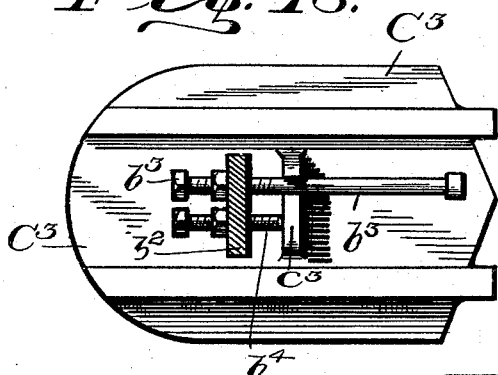
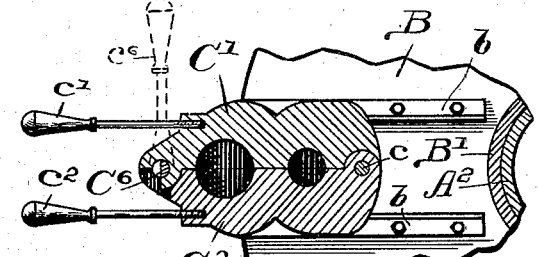
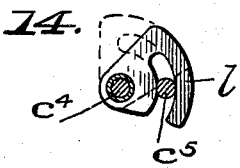
WITNESSES:
F. W. Woerner.
J. A. Walsh.
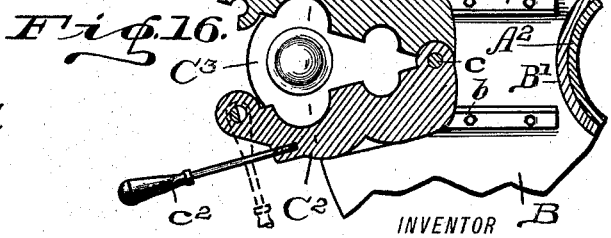
INVENTOR
Alvah L. Bingham,
BY
Chester Bradford,
ATTORNEY.

UNITED STATES PATENT OFFICE.

ALVAH L. BINGHAM, OF MUNCIE, INDIANA, ASSIGNOR TO THE BALL BROTHERS GLASS MANUFACTURING COMPANY, OF SAME PLACE.

GLASS-BLOWING MACHINE.

SPECIFICATION forming part of Letters Patent No. 608,022, dated July 26, 1898.

Application filed August 26, 1897. Serial No. 649,611. (No model.)

*To all whom it may concern:*

Be it known that I, ALVAH L. BINGHAM, a citizen of the United States, residing at Muncie, in the county of Delaware and State of Indiana, have invented certain new and useful Improvements in Glass-Blowing Machines, of which the following is a specification.

The object of my said invention is to produce a machine by means of which articles of glass, such as fruit-jars and the like, may be rapidly and uniformly produced with but a comparatively insignificant amount of manual labor.

The machine embodying my said invention, which will hereinafter be described in detail, consists, generally speaking, of a rotating table carrying a series of molds to receive the plastic glass and various attachments and appliances used in connection therewith by means of which by successive steps such glass is reduced to the form desired, and the operation, generally speaking, is to introduce a suitable quantity of plastic glass into one of the molds, then shift the mold to beneath a plunger or perforator, there partially form it by means of said plunger, then shift the mold to a third position where air-pressure is introduced and the article completely formed, and then shift it to another position, at which point the completed article is removed therefrom.

A machine embodying said invention will be first fully described, and the novel features thereof then pointed out in the claims.

Figure 1:
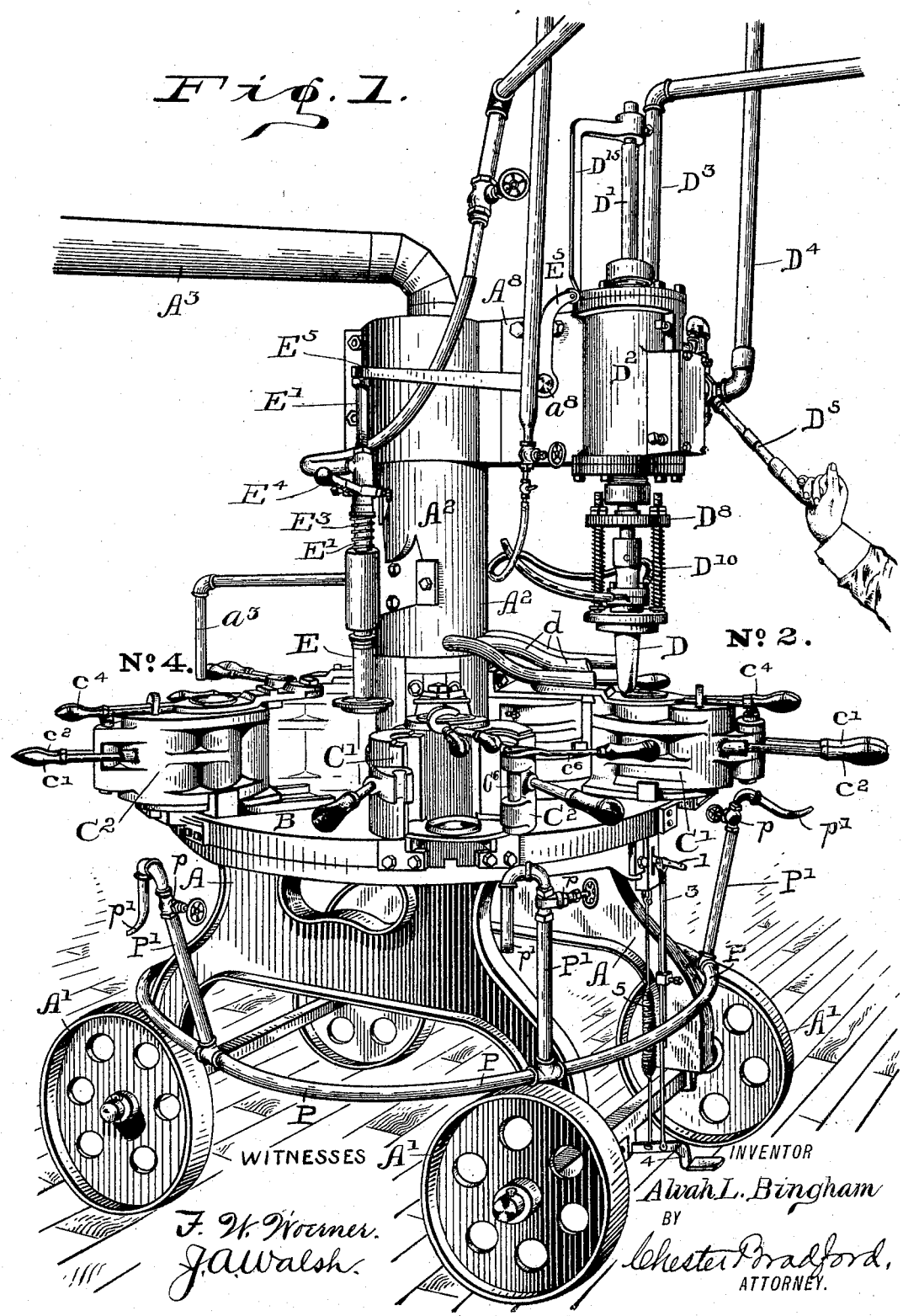
Figure 2:
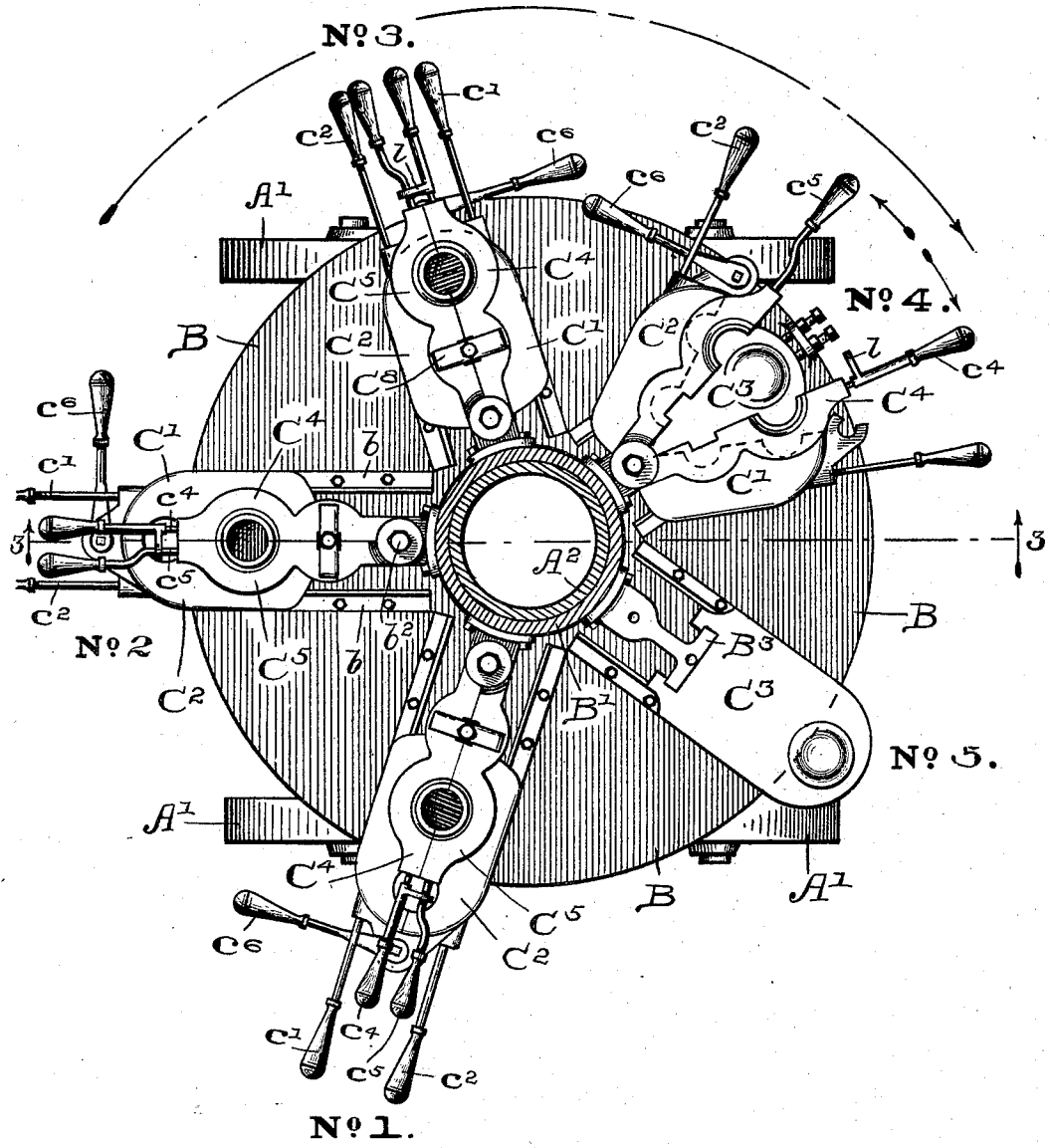
Figure 2:
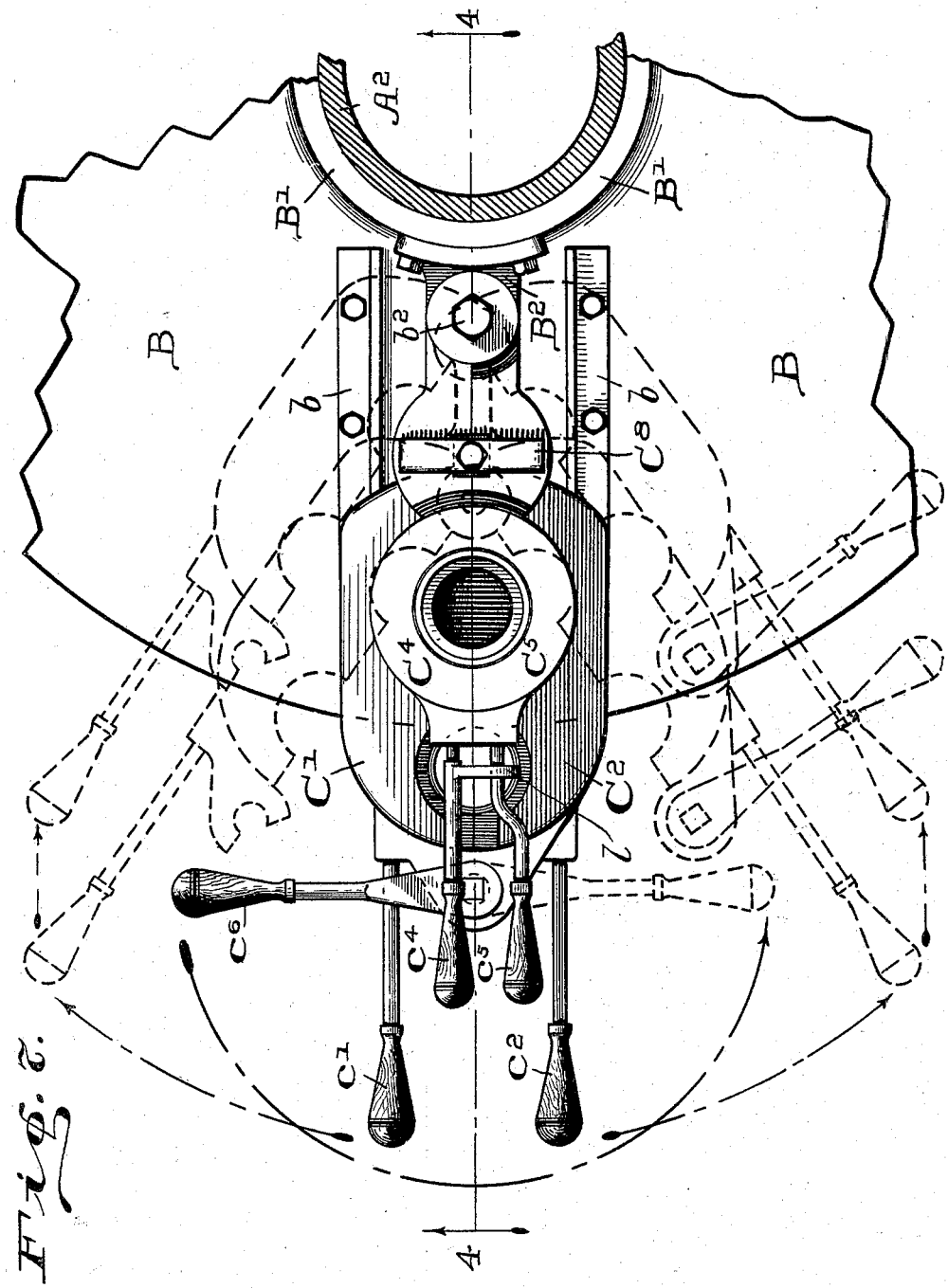

Referring to the accompanying drawings, which are made a part hereof, and on which similar letters and numerals of reference indicate similar parts, Figure 1 is a perspective view of a machine embodying my said invention, together with the various attachments and appliances which I have found it advantageous to use in connection therewith; Fig. 2, a horizontal sectional plan view as seen when looking downwardly from the dotted line 2 2 in Fig. 3, the machine being turned half around from the position shown in Fig. 1, one of the molds proper being removed to show the supporting and attaching devices for said mold more plainly; Fig. 3, a view from the opposite side of the machine to that shown in Fig. 1, partially in elevation and partially in section, as seen from the dotted line 3 3 in Fig. 2, the machine being in the position it occupies just at the time after the plastic glass has been placed in the mold and the mold moved to the proper position so that the plunger is ready to descend; Fig. 4, a detail sectional view, on a considerably-enlarged scale, of a portion of the parts shown in Fig. 3, the plunger itself being shown in section and at its extreme lower position; Fig. 5, a detail sectional view as seen when looking in the direction indicated by the arrows from the dotted line 5 5 in Fig. 4, the plunger itself being shown in section; Fig. 6, a detail elevation as seen from the dotted line 6 6 alongside Fig. 4; Fig. 7, a detail horizontal sectional plan view as seen from the dotted line 7 7 in Fig. 4 and being similar to a portion of Fig. 2, but on a considerably-enlarged scale, the position of the mold being that where it is ready to receive the plunger, the same as in Figs. 3 and 4, while various other positions of the mold parts are indicated by means of a series of dotted lines; Fig. 8, a detail vertical sectional view as seen from the dotted line 4 4 in Fig. 7, but with the position of the molds shifted to the point where the blowing-head is in use and an air-blast applied to complete the formation of the article; Fig. 9, a detail sectional view similar to a portion of Fig. 8, showing the valve seated and on a considerably-enlarged scale; Fig. 10, a horizontal sectional view as seen from the dotted line 10 10 in Fig. 9; Fig. 11, a view of one side of the air-cylinder, showing, in perspective, the air pipes and valves whereby the plunger is controlled; Fig. 12, a view of the other side of said air-cylinder, showing the devices by which the air-blast for forming the glass articles is applied simultaneously with the descent of the plunger; Fig. 13, an under side plan view as seen from the dotted line 13 13 in Fig. 4, showing the adjusting-stops whereby the varying positions of the valves are accurately determined and controlled; Fig. 14, a detail view showing how the mold-cap handles are latched together, as seen from the dotted line 14 14 in Fig. 8; Fig. 15, a horizontal sectional view through the main mold portions when closed and locked together, and Fig. 16 a similar view when the said portions are unlocked and swung apart.

In said drawings the portions marked A represent the frame of my improved machine; B, the rotating table; C', C², C³, C⁴, and C⁵, the several principal portions of the forming-molds, which molds are mounted on said table; D, the plunger or perforator whereby an opening or perforation is formed in the mass of plastic glass, and E the blowing-head through which the blast of air is conveyed into the opening or cavity formed by the plunger and by which blast the forming of the glass article is completed.

The frame A is preferably a heavy metallic frame of suitable form and construction and is shown as mounted on heavy trucks or wheels A'. Centrally a rigid hollow stem or standard A² extends up therefrom, which is supported by a collar $a^2$, seated in said frame A, and by a sleeve A⁵, extending down from said frame. The form and construction of this frame are such as to render it suitable to receive and carry the revolving table, together with the molds and their attachments, and its stem carries the piston-like apparatus whereby the parts D and E are operated. A cold-air pipe A³ leads into the upper end of said standard, and various branch pipes lead out from the sides of said standard, whereby the cold air can be directed against parts which would otherwise become too hot. Three such pipes are shown as positioned to discharge against the plunger D, while one, $a^3$, is shown as positioned to discharge into the hollow glass article being made after the same has been fully formed before it is removed from the mold.

The table B is suitably mounted on the bed of the frame A, preferably on balls $a$, placed in a suitable ball-race between them, and is adapted to revolve around the standard A², being, as clearly shown in several of the figures, provided with a suitable sleeve B', which extends up a considerable distance and surrounds the lower portion of said standard. On this table are mounted the series of molds heretofore referred to, which in the arrangement shown are five in number. The table B is adapted to be revolved as the work proceeds and to be accurately stopped from time to time at the proper points. There are as many notches in the edge or rim of this table as there are molds. Mounted in the frame A, adjacent to said rim or edge, is a latch A⁴, which is operated by means of a treadle. In detail the construction of operating mechanism which I have adopted consists of a lever 1, which is pivoted at 2 to the under side of the bed-plate of the frame A and passes out through the housing to the latch A⁴ (which is slotted to receive it) and through a perforation in said latch. A connecting-rod 3 runs down to the treadle 4, which is pivoted to the axle of the machine, as best shown in Figs. 3 and 1, and a spring-support 5 is also connected to said treadle and to a suitable point on the frame A, by which the treadle is held up, except when forcibly depressed. When it is desired to revolve the table, the operator steps on the treadle, which pulls the latch A⁴ out of engagement with the corresponding notch in said table, when the table is revolved, and the pressure on teh treadle being released the latch flies into the succeeding notch when it reaches it, thus holding said table to the next position, and so on from time to time, as required.

The molds are all alike; but I have designated their positions by numbers, in addition to the description of construction, to facilitate a description of the operation. Each mold is composed of two main or side parts C' and C², hinged together and provided with suitable locking devices, said main mold parts being mounted on a base C³ and movable radially toward and from the center or axial line of the machine, and of two parts C⁴ and C⁵, hinged together, which constitute the upper portion of the mold, wherein the neck to the article is formed, and which are fixed relatively to the axial line of the machine, although adapted to move on their hinges relatively to each other. The upper portion of the mold always remains the same whichever the position occupied by the mold sides in which are the greater portions of the mold-cavities. The base of the mold structure serves also as a bottom to the main mold-cavity while the latter is in use. The main mold sides C' and C² and the base C³ are secured to each other and move together, the latter having sides which extend between flanges $b$ on the face of the table B, which flanges thus serve as ways and guides for the molds. The movement toward and from the center or axial line of the machine should be just equal to the distance between the centers of the primary and main mold-cavities of the respective mold structures. In order that this may be adjusted accurately, I have provided a web or ear $c^3$ on the under side of the mold bottom C³, which extends down between stops whereby the movement is limited. These stops are illustrated in Figs. 4, 8, and 13 and are shown as consisting of two bolts $b^3$ and $b^4$, secured in adjusted position in a projection $b^2$ on the table B. One of said bolts is so arranged that the ear $c^3$ shall come against its end when the molds are adjusted to their extreme outward position, as shown in Fig. 4, while the other of said bolts passes through the ear $c^3$ and has a head upon the opposite side of said ear against which it bears when the mold is adjusted to its extreme inward position, as shown in Fig. 8. As will be readily seen, these bolts can be adjusted very accurately, and when adjusted can be firmly secured to position by the jam-nuts thereon.

As illustrated best in Figs. 15 and 16, (see also Fig. 1,) the main mold-halves C' and C² are pivoted together by pivots $c$ at or near their extreme inner ends and are provided with handles $c'$ and $c^2$ at their forward ends, by which they may be moved toward and from each other laterally and by means of which also the mold structure as a whole, except the top or cover portion, may be moved radially toward or from the center or axial line of the machine. These main mold-halves must be locked together during the operation of molding the article, and I have provided a suitable projection on one of them, with a suitble recess to receive the same on the other, and in the parts alongside said recesses have mounted a rotating rod $C^6$, whose cross-sectional area at the point of engagement is a half-circle. The engaging cavity in the projection on the opposite mold-half is so arranged that when this rod is rotated to one position its semicylindrical portion will fit therein, thus holding the mold-halves strongly together, as shown in Fig. 15, while when rotated to the opposite position it may escape from said engaging cavity and permit the mold-halves to separate, as shown in Fig. 16. Said rod is rotated from one position to the other by its handle $c^6$. The upper mold portion, as before stated, is composed of the halves $C^4$ and $C^5$, which are pivoted together and to a suitable arm $B^2$ on the sleeve $B'$ by a pivot-bolt $b^2$. These halves are provided with suitable handles $c^4$ and $c^5$, and said halves are secured from separation when brought together by a hook-shaped latch $l$ on the shaft of the handle $c^4$, which engages with the similar shaft of the handle $c^5$, as best shown in the detail view Fig. 14. As best shown in Figs. 7, 8, and 14, the handle $c^4$ is made in two parts, the outer of which is sleeve-like in form and carries the latch $l$. These halves $C^4$ and $C^5$ are stopped at the proper position and there held by a suitable stop $C^7$ on the inner end of the arm $B^2$, against which both halves come in contact when brought together, and the cross-bar $C^8$, secured above said stop, prevents said halves from rising upwardly when so drawn together. The entire mold structure is held from any accidental displacement upwardly by the arm $B^2$.

As illustrated most plainly in Figs. 4 and 8, each mold has two mold-cavities, and the main mold portions are, as has already been explained, capable of being moved in a radial direction, so that first one and then the other of these mold-cavities is brought into operative position, while the table as a whole, carrying all of the mold structures, is capable of being revolved so that either of the mold structures may be brought into use in connection with either of the devices for giving the articles being manufactured their interior form.

The operation as ordinarily performed may be understood from the following statement: Referring now to Fig. 2 and assuming that the machine is so positioned that the glass-melting furnace is in convenient relation to the set of molds at the point marked No. 1, an operator gathers a sufficient quantity of molten glass and places it in said set of molds, the main mold portions being drawn outwardly, as shown, so that the smaller or primary mold-cavity is below the neck form carried by or forming a portion of the upper portion or cover of the mold. Immediately after this is done the table is revolved so that the mold structure which is shown in the position marked No. 1 is moved to the position marked No. 2, which is immediately below the plunger D, while of course the mold structure at the position marked No. 5 at the same time reaches the position marked No. 1. The plunger is then caused to descend, forcing the molten glass into the condition shown in Fig. 4. Meanwhile a new supply of molten glass has been placed in the proper cavity in the succeeding mold structure. The table is then revolved so that the first mold structure reaches the position marked No. 3, whereupon the lower or main mold-cavity is below the neck portion of the mold, and said main mold portions are closed together, leaving the partly-formed article depending within the said larger mold-cavity. The blowing-head E is then brought down, and, as will be presently explained, the air is applied, blowing the article out into its complete form. Meanwhile the former operations in respect to the mold structures at the time in the positions marked Nos. 1 and 2 are repeated. The table is again revolved, bringing the original mold structure to the position marked No. 4. In blowing articles which are comparatively thin the mold parts may here be separated and the article removed. In the manufacture of some articles, however, the glass is yet in too plastic a condition to be removed without danger of becoming distorted in the operation, and so I provide, by means of the pipe $a^3$, for a current of cold air, which may blow down into the open neck of the article just formed and further cool it. As before, the operations just described are proceeding in the molds in the other positions. The table is then revolved so that the first mold has reached the position No. 5, where, if the article has not already been removed, it is removed and taken to an annealing-furnace or otherwise, according to the character of the work being done. At the next movement of the table, of course, the mold structure under discussion reaches the original position, at No. 1, ready to receive another portion of plastic glass. The operation thus proceeds rapidly, each mold doing its portion of the work in order. At the point No. 4 or No. 5 the main mold portions are pulled outwardly to the position which brings the smaller or primary mold-cavity below the mold-neck.

The plunger D is best illustrated in Figs. 3 and 4. Its purpose is to form a cavity in the glass into which an air-blast may be directed, so that the blowing operation may be expedited and rendered more accurate and certain. It is operated by a piston-rod D', running into a cylinder $D^2$. The piston is operated by a fluid under pressure, preferably air, entering said cylinder in an ordinary manner through an ingress-pipe $D^3$, the exhaust being through an exhaust-pipe $D^4$. The operation is controlled by a lever $D^5$, which operates a valve whereby the air or other fluid is directed to first one and then the other end of the cylinder, as desired, all as will be readily understood by an examination of the drawings, especially Figs. 1 and 3. It is necessary that this plunger should carry a cover for the upper end of the mold-cavity into which said plunger descends, and it is also necessary to the perfect operation of the machine that said cover should normally travel a trifle in advance of the relative final position thereof in respect to the plunger, in order that it shall be seated firmly before the plunger reaches its ultimate position. Said cover $D^6$ has an annular groove in its under surface, which fits onto corresponding semi-annular meeting projections on the parts $C^4$ and $C^5$. (See Figs. 4 and 7.) Said cover is carried from a plate $D^7$, which surrounds the plunger D near the upper end, and said plate is in turn carried from a similar plate $D^8$, which is rigidly secured to the piston D' by rods $D^9$, which are rigidly secured to the said plate $D^7$, but which pass loosely through said plate $D^8$. Springs $D^{10}$ surround said rods and are interposed between the under surface of the plate $D^8$ and suitable nuts or collars $d^9$ on the rods $D^9$. Jam-nuts $d^8$ on the upper ends of said rods $D^9$, and which rest against the upper surface of said plate $D^8$, furnish the means for accurate adjustment. As stated, the cover $D^6$ is designed to be, when the structure is raised, slightly relatively in advance of the plunger D, as said parts are positioned when the strike is completed, so that as the structure descends said cover will be completely seated on the halves of the upper mold portions before the plunger D itself quite completes its stroke, thus tightly covering the whole cavity. The plate $D^7$, which carries this cover, is held downwardly by the springs $D^{10}$, while when said cover becomes seated said springs may yield somewhat, thus permitting the plunger to continue its travel after the cover becomes stationary. This difference in travel, while ordinarily trifling in extent, is quite important in result. By reason of the continual and rapid insertion of the plunger into the molten glass its temperature (unless some means were employed to reduce it) would be rendered too high. I have therefore provided a means whereby a small stream of cold water may be continuously conducted into the interior of the plunger, which is made hollow for the purpose. The water is conducted to said plunger by means of the flexible pipe $D^{11}$, which connects with a short projecting tube $d^{11}$, which latter is rigid with the interior portion $D^{12}$ of the plunger, which contains two perforations, one of which leads downwardly from the inner end of said tube $d^{11}$ to a cavity within the lower end of the main plunger D and the other of which leads upwardly from said opening to a similar tube $d^{13}$, which may, if desired, connect with a flexible tube $D^{13}$, although as the quantity of water introduced is generally converted into steam this last-mentioned flexible pipe is ordinarily unnecessary. The tubes $d^{11}$ and $d^{13}$, as above stated, are rigidly connected to the interior section $D^{12}$ of the plunger, but section $D^{12}$ is capable of a slight movement in relation to the main plunger portion. As shown in Fig. 4, there is a cavity above this part, within which is seated a spring $D^{14}$, which ordinarily holds it down onto its seat within the main plunger part, but which on occasion will yield somewhat, permitting it to rise. The perforations in the sides of the upper portion of the plunger D, through which the tube $d^{11}$ and $d^{13}$ pass into the inner section $D^{12}$ are elongated somewhat, as indicated in Figs. 4 and 5, so as to permit this movement. The result is that when the heat becomes so great as to create a steam-pressure in the cavity in the lower end of the main plunger portion it can be relieved by the raising of this interior portion without strain upon or danger to the parts. Generally, however, the flow of water is so regulated as that it is barely converted into steam before its final escape; but manifestly in the operation of a machine of this kind variations of temperature cannot be prevented, and therefore this safety device is necessary. The cooling of the plunger D may be aided by air-currents directed against its exterior through tubes or nozzles $d$, which are shown as leading from the hollow standard $A^2$, into which air is directed by the pipe $A^3$.

The blowing-head E is carried on a reciprocating or piston rod E', mounted in an arm or bracket $A^7$ on the standard $A^2$. Said rod is provided with a flange or collar $e'$, and a spring $E^3$ is interposed between said collar and an adjacent surface on said bracket $A^7$, whereby said rod is normally held to its highest position, so that the blowing-head is kept out of contact with the molds. Said rod may, however, be depressed either by a lever $E^4$ by hand or by a bell-crank lever $E^5$, operated from an arm $D^{15}$ on the piston-rod D'. Said bell-crank lever is mounted on a pivot $a^8$, which pivot may be carried on any suitable fixed structure, but is preferably carried by the bracket $A^8$, which also carries the cylinder $D^2$. In order to render the operation of moving the rod E' easy and relieve all shock, a cap-piece is provided, between which and a suitable collar $a$ spring $e^5$ is interposed, which spring first receives the impact of the bell-crank lever $E^5$. This spring also provides for any discrepancies between the movement of the bell-crank lever $E^5$ and the distance the rod E' must travel to properly seat the blowing-head upon the mold. The air for blowing the article is introduced through a flexible pipe $E^6$, which connects with a stem $e^6$ on the rod E, which stem contains a perforation which communicates with a like perforation in the center of said rod and which continues down into the blowing-head, as best shown in Fig. 8. Said blowing-head contains a valve $E^7$, upon the lower end of which is a contact-plate or mold-cover $E^8$, which plate comes in immediate contact with the top of the mold in operation. In Fig. 8 the blowing-head is shown as depressed and this contact-plate or mold-cover thus seated, while the valve is raised so that the current of air is passing freely into the article being formed. When, however, the rod E' is raised and the blowing-head and contact-plate carried upwardly, so that said plate is out of contact with the mold, the valve $E^7$ drops and seats itself, cutting off the flow of air. This latter position, as well as the construction of the parts, is best shown in the detail view, Fig. 9, where said parts are illustrated on an enlarged scale. As will be observed, the arm $D^{15}$ on the piston-rod D' operates the bell-crank lever $E^5$ as the plunger D descends, and thus the plunger and the blowing-head are caused normally to operate simultaneously, which is necessary to the most rapid operation of the machine.

The mold structures, as hereinbefore stated, are to be revolved from one position to another, and obviously the operating parts should be raised out of contact with said molds all at the same time. The shifting of position of the bell-crank lever $E^5$ and the consequent depression of the blowing-head and attached parts are accomplished by the inclined face at the extreme lower end of the arm $D^{15}$, which comes in contact with the adjacent surface of said bell-crank lever immediately after the piston D' begins to descend. The remainder of the surface of the arm $D^{15}$ which travels against the bell-crank lever $E^5$ is parallel with the line of travel of said piston D', and thus the depressed position of the blowing-head is maintained during substantially the entire time while the plunger D is descending and reascending, the shifting of the position of the blowing-head taking place just at the beginning and at the end of the stroke, and thus the blowing operation is in progress during substantially the entire time occupied by the complete movement of the plunger from its initial position down and back to its said initial position, thus giving ample time for the blowing operation. I have provided an antifriction-roller $t$ on the end of the bell-crank lever $E^5$ to reduce friction between it and the arm $D^{15}$ while said parts are in contact.

I have already described the operation of the rotary table and the various positions and operations of the molds mounted thereon. The operations of the other parts of the machine have also been stated in connection with the description thereof. I will, however, briefly recapitulate the operation of the machine as a whole.

The molten glass is put in the mold at position No. 1 and moved to position No. 2. The operator then moves the lever $D^5$, which admits the air to the cylinder $D^2$, and the plunger D is forced down, forming a perforation in the mass of plastic glass. At the same time the blowing-head E is forced down by the means described and seated on the mold which is in advance, and the valve in said blowing-head is automatically opened, enabling the air to enter the article, which is thus blown to complete form. It then passes on to the position No. 4, where it is removed, or, if not in condition for removal, is cooled by means of the air-blast through the pipe $a^3$. The mold is then moved to the position No. 5, where if the article has not already been removed such removal is effected and where the mold is restored to position to receive another mass of plastic glass when it reaches the position No. 1. These operations are continuously repeated as long as the machine is in operation.

It is necessary that the molds should be heated to a certain temperature before the operation commences, because otherwise the molten glass would be chilled as it came in contact therewith. I have therefore provided a gas-pipe P, which is carried on the frame of the machine, as shown in Fig. 1, and which has as many branches P' as there are molds. These branches have nozzles $p'$, which are adapted to be directed into the molds, and valves $p$, by which the supply of gas may be cut off. When it is desired to heat these molds in this manner, a supply of gas is turned on, the nozzles directed into the molds, the valves opened, and the gas lighted and permitted to burn until the necessary heat is obtained. During the active operation of the machine this heating is stopped, as the molten glass itself furnishes all the heat necessary to keep the molds to the proper temperature.

Having thus fully described my said invention, what I claim as new, and desire to secure by Letters Patent, is—

1. The combination, in a glass-blowing machine, of a framework having a central upright; a rotary table mounted thereon; a series of molds mounted on said table and arranged radially to the axis on which said table turns, each mold composed of a bottom portion, a main portion in which are larger and smaller recesses or die-cavities forming the principal portions of two different mold-cavities, one behind the other; a top or cover portion mounted on a fixed pivot and embodying a neck form for the article to be formed, said top or cover portion being composed of two parts adapted to move apart and together; and said mold portion being also composed of two parts adapted to be moved apart and together and also adapted to be moved in respect to the top portion, whereby either mold-cavity may be brought into registry with the neck form thereof; a suitable perforator or plunger adapted to operate in connection with the smaller die-cavity and carried by the central upright of the framework; and a suitable blowing-head also carried by the central upright of the framework and adapted to operate in connection with the larger die-cavity, said plunger or perforator and said blowing-head being positioned a distance apart equal to the distance between the various sets of molds on the table, substantially as and for the purposes set forth.

2. The combination, in a glass-blowing machine, of a suitable table, ways or guides thereon, a mold containing two mold-cavities mounted in said ways or guides and adapted to be shifted from one position to another therein, and adjustable stops whereby the movement of said mold may be adjustably limited, substantially as set forth.

3. The combination, in a blowing-machine, of a suitable table, a mold containing two mold-cavities mounted on said table and adapted to be shifted from one position to another, and a cover or top portion for said mold pivoted to a bracket rigid with the table and composed of two parts, and a stop whereby said parts are stopped at their proper point when brought together.

4. The combination, in a mold for a glass-blowing machine, of two main mold portions hinged together and containing two mold-cavities larger and smaller, a bottom to said mold a portion whereof forms the bottom to the larger or finishing mold-cavity, said mold portions and said bottom being movable between stops on said table, and a top portion forming a neck form for said mold composed of two parts pivoted together and to a bracket $B^2$ rigid with the table structure, and said bracket.

5. The combination, in a mold for glass-blowing machines, with the main portions thereof, of a top or cover portion composed of two parts hinged together and containing a neck form, and handles to said two parts, one of said handles having a sleeve-like outer portion with a latch upon the inner end adapted to engage with the shank of the other handle and thus lock the two parts of said cover together, substantially as shown and described.

6. The combination, in a glass-blowing machine, with an adjustable mold and the table whereon it is mounted, of a flange or ear on the bottom of the mold structure, and two adjustable bolts carried by the table on which the mold structure is mounted, one of which bolts passes through said ear or flange and has a head upon the opposite side, and the other of which is positioned to come against the adjacent side of said ear or flange, whereby the movement of the mold may be accurately adjustably limited in both directions, substantially as set forth.

7. The combination, in a glass-blowing machine, with a mold structure, of a plunger or perforator composed of a hollow main portion, a perforated interior portion mounted therein, the perforations whereof lead to a cavity in the lower end of said hollow main portion, said perforated interior portion being also yieldingly seated, whereby it is enabled to raise under any excess of pressure which may exist in said cavity, and an inlet and an outlet pipe connected to the said perforations, substantially as set forth.

8. The combination, in a glass-blowing machine, with a mold structure, of the plunger D, the perforated interior portion $D^{12}$, stems $d^{11}$ and $d^{13}$ connecting with the perforations therein, flexible tubes $D^{11}$ and $D^{13}$ connected to said stems, a cavity in said plunger D below the lower end of said interior portion $D^{12}$ into which the perforations lead, a cavity in the main structure above said interior portion $D^{12}$, and a spring $D^{14}$ situated therein, said several parts being arranged and operating substantially as shown and described.

9. The combination, in a glass-blowing machine, of a framework, a rotating table carrying a series of molds, a plunger or perforator adapted to coöperate with one mold structure, a blowing-head adapted to coöperate with another mold structure, a fluid-operated piston carrying and operating said plunger, a spring-supported reciprocating rod carrying said blowing-head, and a connection between said piston and said reciprocating rod, whereby as the plunger descends into one mold the blowing-head is seated upon another mold, substantially as and for the purposes set forth.

10. The combination, in a glass-blowing machine, of a rotary table or carrier, a plurality of molds carried by said table, a plunger and a blowing-head arranged above said molds and positioned the same distance apart as said molds are, a fluid-operated piston whereby said plunger is carried and operated, a reciprocating rod whereby said blowing-head is carried, means whereby said reciprocating rod and said blowing-head are normally held elevated, means whereby as said piston descends said reciprocating rod is also forced to descend, an air-duct leading to said blowing-head, and means for automatically opening said air-duct when said blowing-head is seated on a mold-top and for closing said duct when said blowing-head is raised out of contact with said mold-top, said several parts being arranged and operating substantially as and for the purposes set forth.

11. The combination, in a glass-blowing machine, of a framework, a rotating table mounted thereon, a series of mold structures mounted on said table, a plunger or perforator situated above said table, a piston and piston-rod for driving said plunger, a blowing-head also situated above said table, a piston-rod carrying said blowing-head, a bell-crank lever pivoted between the said two sets of apparatus, and an arm carried by the piston of the plunger and adapted to engage with and operate said bell-crank lever and through it said blowing-head piston-rod, substantially as shown and described.

12. The combination, in a glass-blowing machine, with a series of molds, of a plunger or perforator situated above the molds, a blowing-head also situated above the molds, a piston whereby the plunger or perforator is driven, an arm carried by said piston having an inclined lower end and a surface parallel with the piston-rod, and a bell-crank lever interposed between said arm and the piston-rod of the blower-head the end whereof is adapted to come in contact with the inclined portion of said arm at the beginning and at the end of the stroke of the plunger-piston and remain in contact with the parallel portion thereof during the remainder of the stroke, substantially as and for the purposes set forth.

13. The combination, with a glass-blowing machine consisting of a framework, a rotary table mounted thereon, and a series of mold structures mounted on said table, of a primary heating apparatus for heating said mold structures before the beginning of work with said machine, consisting of a gas-pipe, a series of branch pipes leading therefrom, valves in said branch pipes, and nozzles beyond said valves which are adapted to be directed into the cavities of the mold structures, substantially as shown and described.

In witness whereof I have hereunto set my hand and seal, at Muncie, Indiana, this 20th day of August, A. D. 1897.

ALVAH L. BINGHAM. [L. S.]

Witnesses:
EDMUND B. BALL,
FRANK C. BALL.